(12) United States Patent
Kibashi et al.

(10) Patent No.: US 7,149,160 B2
(45) Date of Patent: Dec. 12, 2006

(54) RECORDING AND PLAYING BACK DEVICE WITH ERROR CORRECTION

(75) Inventors: Akira Kibashi, Zama (JP); Keiji Kobayashi, Fujisawa (JP); Makoto Takase, Yamato (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 314 days.

(21) Appl. No.: 09/955,548

(22) Filed: Sep. 17, 2001

(65) Prior Publication Data

US 2002/0075735 A1 Jun. 20, 2002

(30) Foreign Application Priority Data

Sep. 18, 2000 (JP) .............................. 2000-281184

(51) Int. Cl.
*G11B 7/00* (2006.01)
(52) U.S. Cl. .................................................. 369/47.14
(58) Field of Classification Search ................... 369/83, 369/53.35, 53.37, 47.34, 47.14
See application file for complete search history.

(56) References Cited

U.S. PATENT DOCUMENTS

| | | | | |
|---|---|---|---|---|
| 4,813,011 A | * | 3/1989 | Kulakowski et al. .......... 711/4 |
| 5,233,584 A | * | 8/1993 | Kulakowski et al. ..... 369/44.27 |
| 5,524,190 A | * | 6/1996 | Schaeffer et al. ........... 715/522 |
| 5,568,608 A | * | 10/1996 | Shannon ....................... 714/44 |
| 5,796,703 A | * | 8/1998 | Schell et al. ................ 369/116 |
| 5,822,600 A | * | 10/1998 | Hallowell et al. .......... 713/340 |
| 5,909,334 A | * | 6/1999 | Barr et al. ..................... 360/53 |
| 6,014,754 A | * | 1/2000 | Yamada ......................... 714/5 |
| 6,034,897 A | * | 3/2000 | Estakhri et al. ........ 365/185.33 |
| 6,163,338 A | * | 12/2000 | Johnson et al. ............. 348/148 |
| 6,169,710 B1 | * | 1/2001 | Arai ........................ 369/30.11 |
| 6,198,709 B1 | * | 3/2001 | Shirane ................... 369/59.22 |
| 6,301,670 B1 | * | 10/2001 | Motoyama et al. ......... 713/300 |
| 6,408,326 B1 | * | 6/2002 | Larsson et al. ............. 709/201 |
| 6,671,249 B1 | * | 12/2003 | Horie ....................... 369/275.3 |
| 6,697,314 B1 | * | 2/2004 | Anzai et al. ............. 369/59.26 |
| 6,816,974 B1 | * | 11/2004 | Nurmi et al. ................ 713/202 |

* cited by examiner

*Primary Examiner*—Gautam R. Patel
(74) *Attorney, Agent, or Firm*—Bracewell & Giuliani LLP

(57) ABSTRACT

If the number of retries made before data is read successfully reaches or exceeds a predetermined number, the data is saved in spare sectors SS and then data sectors DS which originally stored the data are overwritten. Furthermore, both when data is saved in spare sectors SS and when data is written over data sectors DS, appropriate pointer information in RDM table stored in a reserved area RA including a nonvolatile memory is updated as required.

2 Claims, 3 Drawing Sheets

RECORDING AND PLAYING BACK DEVICE WITH ERROR CORRECTION

BACKGROUND OF THE INVENTION

1. Field of the Invention

The present invention relates to a recording and playing back device such as a hard disk drive, storage device, computer device, data processing method, and program sending device.

2. Background of the Invention

As is well known, hard disk drives are used frequently as a major location for storing data in computer devices. Recently, the storage capacity of hard disk drives has been increasing, bringing with it dramatic increases in the recording density of recording disks. As a result, the radial distance between tracks on a recording disk has been getting shorter. Consequently, reading data by the head requires higher positioning accuracy on the track where desired data is stored, making data read conditions severer from year to year.

In such hard disk devices, if a data read operation from a recording disk fails for some reason or other, an attempt to read data is made again (so-called "retry"). Since making unlimited number of retries may cause data corruption or the like, an upper limit is normally placed on the number of retries so that a read error will result when this limit is reached. As shown in FIG. 3, at the time of when reading data (Steps S601 and S602), even if the number of retries made before data is read successfully does not reach the upper limit, if it exceeds a predetermined reference number (<upper limit) (Step S603), a so-called "reassign process" is performed (Step S604). This is the process of transferring data stored on a recording disk from its original sectors to other sectors to protect the data.

However, if a reassign process is repeated many times, data many be scattered over the recording disk. If data to be read successively are scattered over different tracks, in particular, the head must move among tracks frequently, resulting in reduced read performance.

Such a problem is not limited to hard disk drives, but it is common to read operations from various storage media.

The present invention has been achieved to solve such a technical problem. Its object is to provide a recording and playing back device, storage device, computer device, data processing method, and program sending device that can effectively protect the data stored on storage media and storage disks.

SUMMARY OF THE INVENTION

The recording and playing back device of the present invention provides a data overwrite means for overwriting read data on a storage medium if a command has been issued a predetermined number of times or more by retry command means when a data read operation is determined to be successful by determination means for determining whether data was read successfully. In this way, if a predetermined number or more retries are made before data is read, the data is considered to be unstable and data corruption or the like can be prevented by overwriting this data. In so doing, should the overwrite fail, data loss can be avoided by saving the data to be overwritten to a nonvolatile memory before overwriting the data by the data overwrite means. Regarding the nonvolatile memory, the storage medium itself may be a nonvolatile memory, but it is also possible to equip the recording and playing back device with a nonvolatile memory.

At the time of saving the data by data saving means or overwriting data by the data overwrite means, information can be maintained about stored location of flawless data by changing pointer information using pointer information changing means. The pointer information here points to the stored location of the data to be read by reading/writing means in the storage medium. The storage medium to read/write data from/to in the recording and playing back device may be a portable storage medium such as a flexible disk, MO (Magneto-Optical) disk, DVD (Digital Versatile Disk), etc.; a recording disk of a hard disk drive; etc.

Also, the recording and playing back device of the present invention comprises a controller which makes a head perform a first process of reading the data stored in a first area of the recording disk and storing it in a temporary storage; a second process of writing the data stored in said temporary storage to a second area of the recording disk if certain conditions are satisfied; and a third process of writing the data stored in the temporary storage to the first area.

Among the sequence of processes that the controller makes the head perform, the third process writes the data that has been read from the first area to the first area, which thereby is overwritten. The second process writes the data to the second area different from the first area to save it before it is overwritten in the third process.

Furthermore, pointer information which points to the fact that data is stored in the above described second area is stored in a nonvolatile memory in the second process. Then even if the third process is not completed, i.e., the overwrite fails for some reason in the third process, data can be read from the second area based on the pointer information stored in the nonvolatile memory when it becomes necessary after a reboot to read the data by the head. Thus, data loss can be avoided.

Also, since the pointer information pointing to the fact that the data is stored in the first area is stored in the nonvolatile memory in the third process, when reading the data after a successful overwrite, the data written over the old data is read from the first area.

Regarding the nonvolatile memory for storing the pointer information, the storage device may be equipped with a nonvolatile memory or part of the recording disk may be designated as a nonvolatile memory.

The present invention is a computer device equipped with a storage device and host device, wherein the storage device can comprise a controller which performs a data save process and data write process if a predetermined number or more retries are required before data is read successfully from the nonvolatile recording disk.

The data save process and data write process described above provide capabilities to enhance the soundness of data to the storage device of the computer device. Then, if the data write process writes data to the same track as where the data was originally stored, the data can be read by moving the head the same amount as when the data was written. The destination of the data need not be the same sectors as where the data was stored as long as it is the same track as the original track where the data was stored.

At the time of performing a read test on the data stored on the nonvolatile recording disk, the controller can perform a data save process and data write process if the number of retries made before reading the data reaches or exceeds a predetermined threshold. If read testing is performed on a predetermined area of the nonvolatile recording disk, for example, on the entire data storage area, the data that requires a number of retries in excess of a predetermined threshold can be overwritten. This makes it possible to stabilize unstable data and enhance the soundness of the data.

It is preferable that the threshold for performing a data save process and data write process during read testing should be set lower than the number of retries allowed before performing a data save process and data write process at a request from the host device. This will make the conditions for read testing severer than during normal read operations, and thus enhance the effectiveness of the read testing.

The present invention can also be seen as a data processing method wherein if a predetermined number or more retries are made when data is read from sectors of a nonvolatile storage medium, the data processing method performs a first step of saving the data to other sectors and changing the pointer information which points to the stored location of the data; and a second step of writing the data over the sectors from which it was originally read and changing the pointer information to these sectors.

Besides, if the sectors are released after the data overwrite is complete in the second step, it can be used for other purposes.

Also, the present invention may be a program sending device, comprising storage means for storing a program to be executed by a computer device and a transmission means for reading the program out of the storage means and transmitting it to the computer device, wherein the program makes the computer device perform a process of saving any data on which retries were determined to have been made a predetermined number of times or more to another area of the storage medium and a process of overwriting a predetermined area with the data.

The data to be saved to the other area and the data to be written over the predetermined area may be the data read from the predetermined area and stored temporarily in a nonvolatile memory. Also the data to be written over the predetermined area may be, for example, the data saved to the other area.

The computer device here may be a drive that reads and writes data from/to various storage media. A program stored in the storage means can be transmitted from the transmission means of the program sending device to the computer device such as a drive via, for example, a connector. Then the computer device that receives the program can run processes based on the program by install it, as required.

DETAILED DESCRIPTION OF THE PREFERRED EMBODIMENT

The present invention will be described in detail below with reference to the preferred embodiment illustrated in the accompanying drawings.

Figure 1:
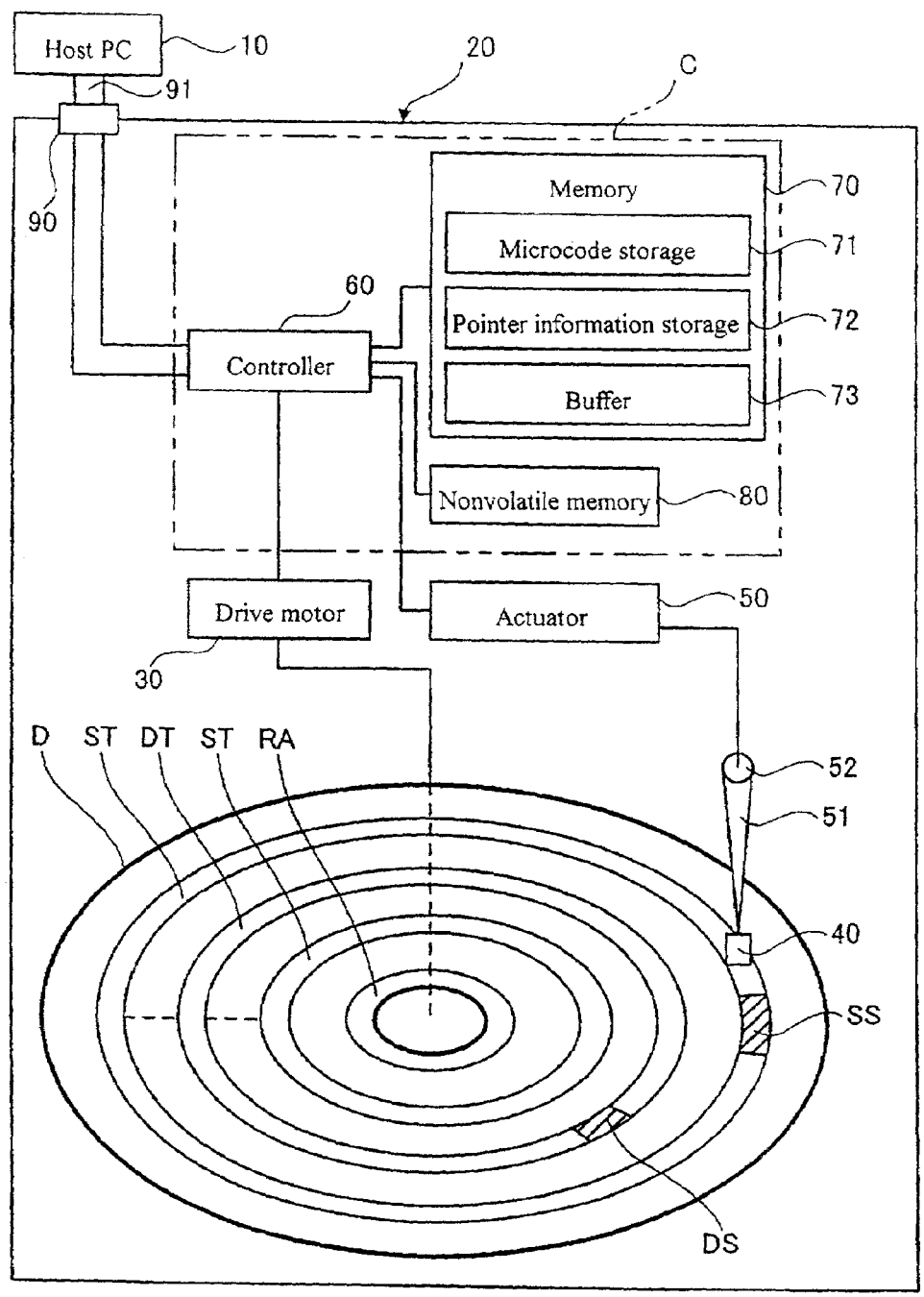
FIG. 1 is a drawing showing a configuration of a computer device according to this embodiment.

FIG. 1 is a drawing showing the configuration of the computer device according to this embodiment. As can be seen from the drawing, the computer device comprises, a host PC (host device) 10 consisting of the computer body etc. and a hard disk device (storage device and recording and playing back device) 20.

The host PC 10 requests the hard disk device 20 to read and write data, etc.; receives the read data from the hard disk device 20; enters the data to be written to the hard disk device 20; and so on.

The hard disk device 20 comprises, a nonvolatile recording disk (storage medium) D, drive motor 30 for rotationally driving the recording disk D, head (reading/writing means) 40 for reading and writing data from/to the recording disk D, actuator 50 for driving the head 40, and control block C for controlling the drive motor 30 and actuator 50.

The head 40 is mounted at the tip of an arm 51, which swings freely about a shaft 52 in a plane along the surface of the recording disk D. When the shaft is driven rotationally by the actuator 50, the arm 51 swings making the head 40 capable of accessing a designated area on the recording disk D.

The control block C comprises a controller 60, memory (temporary storage means) 70, and nonvolatile memory 80.

The controller 60, which comprises determination means, retry command means, data overwrite means, data saving means, and pointer information changing means, controls the operation of the drive motor 30 and actuator 50 and processes the data to be read and written by the head 40. It is connected to an interface 90, which in turn is connected to the host PC 10 via a bus, making it possible to transfer requests from the host PC 10 and transfer data between the host PC 10 and controller 60.

A DRAM (Dynamic Random Access Memory) or the like is used as the memory 70, which comprises a microcode storage 71 for temporarily storing the microcode (microprograms) for use in the processing by the controller 60, pointer information storage 72 for storing pointer information, i.e., the positional information for use by the head 40 in reading data from the recording disk D, and buffer 73 for temporarily storing the data to be read and written by the head 40.

The nonvolatile memory 80 employs a ROM (Read Only Memory) such as EEPROM (Electrically Erasable and Programmable ROM). It contains programs (microcode) and the like for running predetermined operations on the hard disk device 20. Based on these programs, the controller 60 performs the processes of the determination means, retry command means, data overwrite means, data saving means, and pointer information changing means. The recording disk D, is a circular, for example, magnetic disk. It is divided radially into a plurality of areas to form a plurality of ring-shaped tracks, where groups of, for example, 256 or 512 data tracks DT for storing data are placed alternately with a spare track ST used for other purposes. A predetermined location, e.g., the innermost track, of the recording disk D has been designated as a reserved area RA for use by the hard disk device 20 itself. Each ring-shaped area of the data tracks DT, spare tracks ST, and reserved area RA is divided circumferentially into a plurality of sectors so that data will be stored in each sector. The sectors of the data tracks DT and spare tracks ST will be referred to herein as data sectors (first area, sectors, predetermined area) DS and spare sectors (second area, other sectors, another area) SS, respectively.

The reserved area RA of the recording disk D stores a RDM (Reassign Defect Map) table, which manages the pointer information that indicates whether individual data items in the recording disk D are stored in data sectors DS or spare sectors SS. Hereinafter, pointer information will be denoted as RDM(d) when desired data is stored in data sectors DS, and as RDM(s) when desired data is stored in spare sectors SS.

The RDM table is read from the reserved area RA and stored in the pointer information storage 72 of the memory 70 during the initialization (power on reset) operation performed when the computer device is started. When data is read form the recording disk D, the controller 60 refers to the RDM table in the pointer information storage 72, obtains the pointer information that indicates whether the desired data is located in data sectors DS or spare sectors SS, and then drives the head 40, based on this information.

Now description will be given about how data is read from the recording disk D of the hard disk device 20 and how data is overwritten if the number of retries during attempts to read the data reaches or exceeds a predetermined number, on a computer device with the above configuration.

When a specific user operation causes the host PC 10 to request the hard disk device 20 to read data, the request is transferred to the controller 60 via the interface 90.

The controller 60 obtains the pointer information that indicates whether the data is located in data sectors DS or spare sectors SS, with reference to the RDM table stored in the pointer information storage 72 of the memory 70. Based on this information, the controller 60 swings the arm 51 by controlling the actuator 50 to move the head 40 to the data track DT (or spare track ST) which contains the data sectors DS (or spare sectors SS) which store the desired data.

Since the recording disk D is rotated by the drive motor 30 at a predetermined rotational speed, when the data sectors DS (or spare sectors SS) which contains the data to be read comes just under the head 40, the head 40 reads the given data from the data sectors DS (or spare sectors SS). The data read out is temporarily stored in the temporary storage means, i.e., the buffer 73 of the memory 70, and then transferred from the buffer 73 to the host PC 10 via the interface 90.

Data is read from the recording disk D in the manner described above, but data sometimes fails to be read for various reasons such as flaws, dirt, foreign matter, etc. on the surface of the recording disk D. In such cases, the controller 60 acts as determination means and determines whether data was read successfully. If data failed to be read successfully, the controller 60 acts as retry command means and commands the head 40 to try to read the data again.

At the time of reading data from the recording disk D as described above, if the number of retries made before the data is read successfully reaches or exceeds a predetermined number (e.g., 100), this embodiment performs the data overwrite process described below to protect the data stored in the recording disk D.

Figure 2:
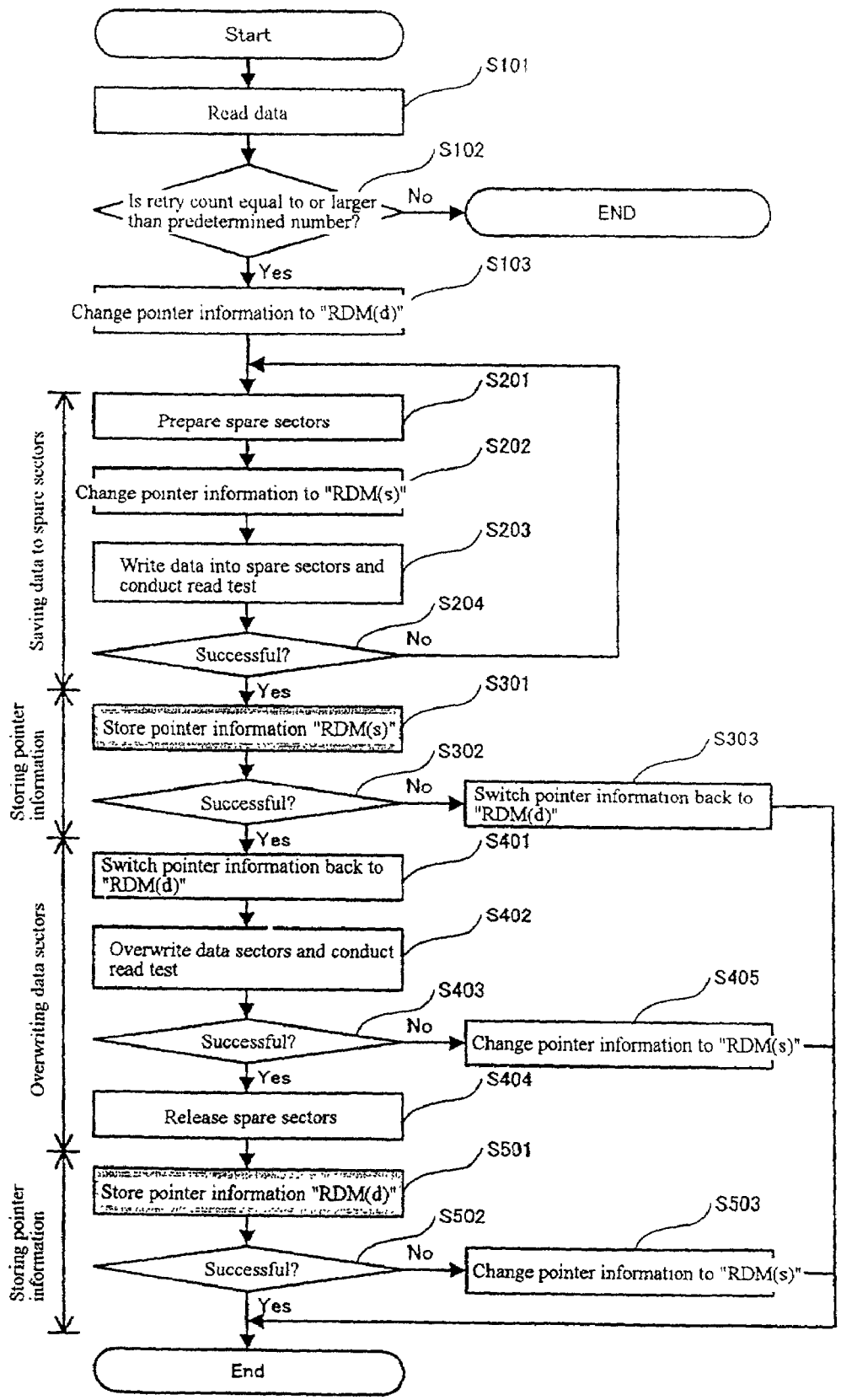
FIG. 2 is a chart showing flow of a sequence of data processing.
Figure 3:
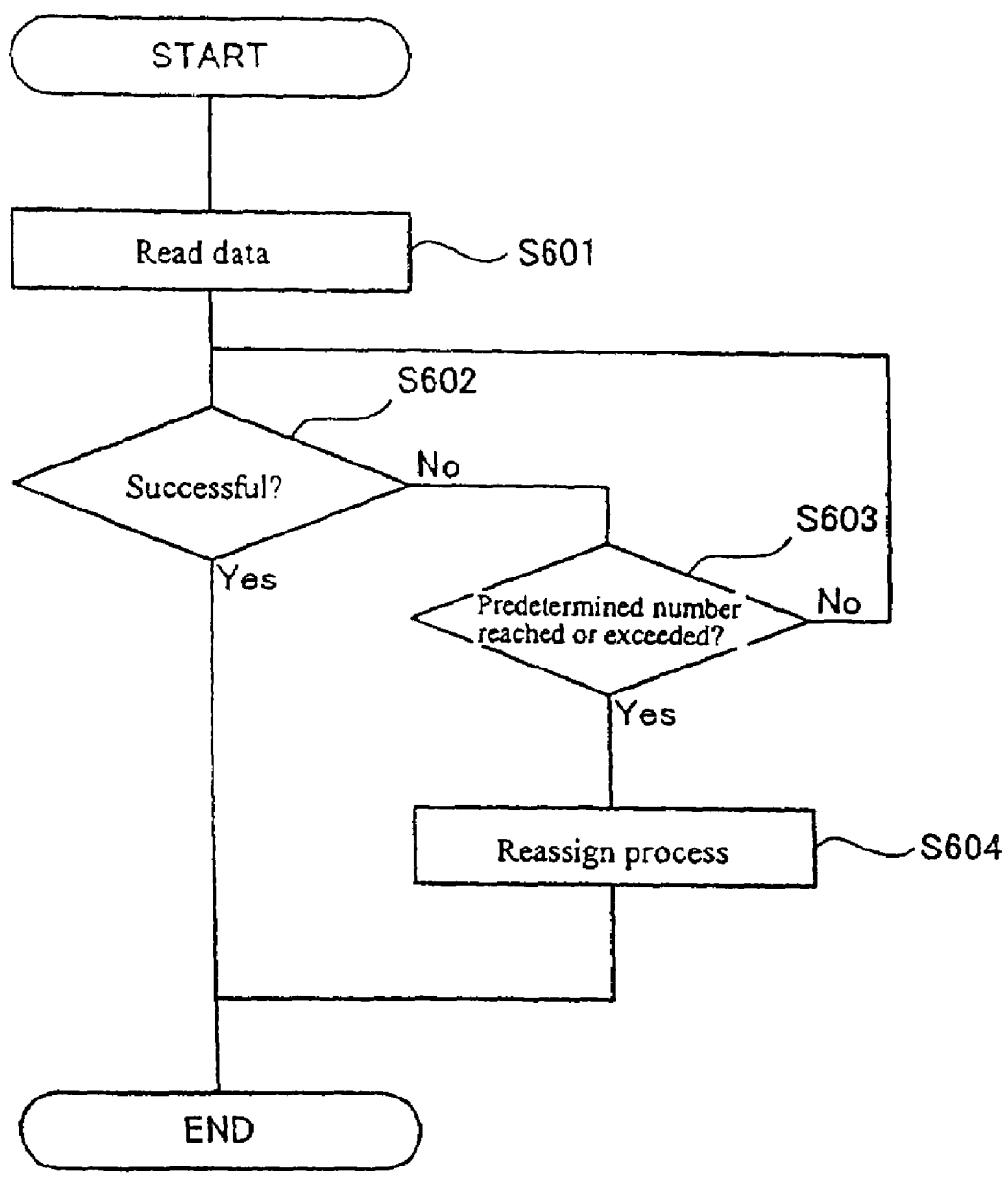
FIG. 3 is a chart showing flow of a conventional reassign process.

FIG. 2 shows a flow of a data overwrite process. When a data read operation (Step S101) is complete in the data read process described above, it is determined at the controller 60 acting as data overwrite means whether the number of data read retries is equal to or larger than the predetermined number (e.g., 100) (Step S102).

If it turns out that the number of retries is less than the predetermined number, it is determined that the data overwrite process in unnecessary and the process is ended. On the other hand, if the number of retries is equal to or larger than the predetermined number, it is determined that the data overwrite process is necessary and Step S103 is performed.

In Step S103, the pointer information of the data needing overwriting is changed in the RDM table stored in the pointer information storage 72 of the memory 70. Specifically, if the data that needs overwriting is stored in data sectors DS, the pointer information stored in the RDM table contains "RDM(d)" and if the data is stored in spare sectors SS, the pointer information contains "RDM(s)." In either case, pointer information is changed to "RDM(d)." However, this applies only to the RDM table stored in the memory 70, and the information in the RDM table stored in the reserved area RA of the recording disk D is not updated.

Next, in order to temporarily save the data needing overwriting, spare sectors SS are prepared on the recording disk D (Step S201). The term "prepare" here means to specify target spare sectors SS for saving data. To minimize the amount of the head 40 travel for access, it is preferable to specify the spare sectors SS on the spare track ST closest to the data track DT which contains the data sectors DS (or spare track ST which contains the spare sectors SS) that store the data needing overwriting.

Then, the pointer information of the data is changed from "RDM(d)" to "RDM(s)" in the RDM table stored in the pointer information storage 72 of the memory 70 (Step S202).

Next, in Step S203, the controller 60 acting as data saving means writes the data needing overwriting into the specified spare sectors SS. At this time, the data stored temporarily in the buffer 73 of the memory 70 during the data read operation in Step S101 is read and written into the spare sectors SS.

When the data write operation into the spare sectors SS, i.e., the data save operation is finished, a read test is conducted to check whether the written data can be read from the spare sectors SS.

In Step 204, it is determined whether the process of Step S203 was successful. If it was successful, the flow goes to a pointer information storage process described later. If it was not successful, the flow returns to Step S201 where the data save process to the spare sectors SS is repeated the predetermined number of times.

After the data to be overwritten is saved to the spare sectors SS, the controller 60 acting as pointer information changing means changes the pointer information of the data to "RDM(s)" and stores it in the RDM table stored in the reserved area RA serving as a nonvolatile memory (Step S301).

Then it is determined whether the process of Step S301 was successful (Step S302). If it was successful, the flow goes to the next step S401. The pointer information of the data is changed to "RDM(s)" in the RDM table stored in the reserved area RA serving as a nonvolatile memory.

On the other hand, if the process of Step S301 was not successful, the process of Step S301 is retried the predetermined number of times. If the process is still unsuccessful, the pointer information of the data is switched back to "RDM(d)" in the RDM table stored in the pointer information storage 72 of the memory 70 (Step S303), and the sequence of processes are completed. The pointer information of the data in the RDM table stored in the reserved area RA remains set at "RDM(d)."

If the process is determined to be successful in Step S302, the pointer information of the data is switched back to "RDM(d)" in the RDM table stored in the pointer information storage 72 of the memory 70 (Step S401).

Next in Step S402, the data that was temporarily stored in the buffer 73 of the memory 70 during the data read operation of Step S101 is written into the data sectors DS where the data had originally been stored. This overwrites the data in the data sectors DS.

After the data sectors DS are overwritten, a read test is conducted to check whether the written data can be read out of the data sectors DS.

In Step S403, it is determined whether the process of Step S402 was successful. The spare sectors SS used in Steps S201 to S204 are released to make them available for reuse (Step S404).

If the process of Step S402 was not successful, retries are made the predetermined number of times. If the process is still unsuccessful, the pointer information of the data is changed to "RDM(s)" in the RDM table stored in the pointer information storage 72 of the memory 70 (Step S405), and the sequence of processes are completed. The pointer information of the data in the RDM table stored in the reserved area RA remains set at "RDM(s)," as it was set in Step S301.

After the spare sectors SS are released in Step S404, the pointer information of the data is changed to "RDM(d)" and stored in the RDM table stored in the reserved area RA serving as a nonvolatile memory (Step S501).

Then, it is determined whether the process of Step S501 was successful (Step S502). If it was successful, the sequence of processes are completed. The pointer information of the data in the RDM table stored in the reserved area RA remains set at "RDM(d)."

On the other hand, if the process of Step S501 was not successful, the process of Step S501 is retried the predetermined number of times. If the process is still unsuccessful, the pointer information of the data is changed to "RDM(s)" in the RDM table stored in the pointer information storage 72 of the memory 70 (Step S503), and the sequence of processes are completed. The pointer information of the data in the RDM table stored in the reserved area RA remains at "RDM(s)," as it was set in Step S301.

As described above, if the number of retries made before data is read successfully reaches or exceeds a predetermined number, the data sectors DS which originally stored the data are overwritten. The sequence of processes described above are performed if the number of retries is equal to or larger than the predetermined number at the time when data is read successfully in Step S101. In other words, unstable data that requires many retries and may be rendered unreadable in the future is overwritten beforehand as described above in order to prevent subsequent read errors and reduce the number of subsequent retries, thereby improving read performance.

Besides, by overwriting the data sectors DS which originally stored the data, it is possible to reduce the amount of head travel compared to a reassign process, which moves data to other sectors, and thus avoid reduction in read performance.

Furthermore, since data is temporarily saved to spare sectors SS when it is overwritten, data loss on the recording disk D can be avoided should trouble occur when the data is being overwritten.

Now description will be given about cases in which the sequence of processes described above are aborted due to trouble caused by an external factor such as power failure, reset, or vibration (hereafter referred to simply as "if the process is aborted").

If the process is aborted in or before Step S103, the data that should have been overwritten remains in the original data sectors DS and the pointer information in the RDM table stored in the reserved area RA remains unchanged. Although the pointer information in the RDM table stored in the pointer information storage 72 of the memory 70 is set to "RDM(d)" in Step S103, if the hard disk device 20 is restarted, the pointer information remains unchanged because the RDM table is read from the reserved area RA and stored in the pointer information storage 72 of the memory 70. Therefore, at least data loss can be avoided and data can be read as before.

If the process is aborted between Step S201 and Step S204, the original data remains in the data sectors DS. The pointer information in the RDM table stored in the reserved area RA remains unchanged as well. Therefore, only the data saved in the spare sectors SS will be corrupted at the worst, but the original data is not lost and data can be read as before. If the process is aborted between Step S401 and Step S404, the data has been saved to the spare sectors SS and the pointer information in the RDM table stored in the reserved area RA has been set to "RDM(s)" in Step S301. Therefore, although the data written over the data sectors DS may be corrupted, the pointer information remains set at "RDM(s)" because the RDM table is read from the reserved area RA and stored in the pointer information storage 72 of the memory 70 when the hard disk device 20 is restarted. Since the data saved in the spare sectors SS is read out, no data is lost and the data can be read with a smaller number of retries than when the data is read newly. However, since the data reassigned to the spare sectors SS is read out, there may be some reduction in read performance corresponding to the amount of head 40 travel to the spare sectors SS.

If the data overwrite fails in Step S402 even if the process is not aborted, the pointer information in the RDM table stored in the pointer information storage 72 of the memory 70 is changed to "RDM(s)" in Step S405. Consequently, when reading this data subsequently, the data is read from the spare sectors SS with reference to the RDM table stored in the pointer information storage 72 of the memory 70 unless the hard disk device 20 is switched off. On the other hand, if the hard disk device 20 is restarted after being switched off once, the RDM table is read from the reserved area RA. Since the pointer information of the data has been changed to "RDM(s)" in Step S301, the data is read from the spare sectors SS. Thus, even if the overwrite fails in Step S402, there will be no problem.

If the process is aborted in Step S502 or later, the data has already been written over the data sectors DS. Moreover, the pointer information in the RDM table stored in the reserved area RA has been set to "RDM(d)" in Step S501. Therefore, the pointer information remains set at "RDM(d)" and the data written over the data sectors DS can be read out because the RDM table is read from the reserved area RA when the hard disk device 20 is restarted. This can reduce the number of retries and improve read performance as when the sequence of processes are completed.

In this way, since the pointer information in the pointer information storage 72 of the memory 70 as well as in the RDM table stored in the reserved area RA is updated as required at important points in the sequence of processes, subsequent processes or data read operations will not be hampered should trouble arise during a process.

Thus, the sequence of processes effectively protect the data stored on the recording disk D and prevent any trouble during a process from hampering subsequent processes or data read operations.

The sequence of processes according to the embodiment described above can be applied not only to the cases in which data is read at a request from the host PC 10, but also to self-checking menus, etc. run periodically by the hard disk device 20 for itself. Specifically, when the hard disk device 20 conducts read testing of stored data for itself by scanning, for example, the entire area of the recording disk D, if the number of retries made before the data is read successfully reaches or exceeds a predetermined number, the data may be overwritten as is the case with the above example. Thus, by overwriting unstable data during self-checking, the soundness of the data can be improved. In such a case, the threshold for a data overwrite to be performed, i.e., the set value of retry count above which a data overwrite is determined to be necessary in Step S102, should preferably be set lower than when data is normally read at a request from the host PC 10. This will make self-testing of the hard disk device 20 more meaningful.

Although in the above embodiment, the RDM table is stored in the reserved area RA of the recording disk D, it may also be stored in another area of the recording disk D or in the nonvolatile memory 80. In that case, the pointer information is stored in the nonvolatile memory 80 in Steps S301 and S501.

Also, although the above embodiment is configured to save data read from data sectors DS or spare sectors SS to spare sectors SS, data may be saved to any sectors, such as unused data sectors DS, as long as they are different from the sectors from which the data was read. Besides, data may be saved in a nonvolatile memory, such as the nonvolatile memory 80 of the computer device according to the above embodiment, other than the recording disk D itself, but in that case, the data cannot be retained on the recording disk D if trouble occurs.

Also, although the above embodiment has been described with reference to an example in which the present invention is applied to the hard disk device 20 installed on a computer device, the hard disk device 20 may be either a built-in type incorporated in the computer device or an external type.

Besides, the present invention can also be applied to drive devices (recording and playing back devices) that read and write data from/to portable storage media such as flexible disks, MO (Magneto-Optical) disks, DVDs (Digital Versatile Disks), etc. Such drive devices will have, a head for reading and writing data, a head drive mechanism, a disk drive mechanism, etc. as well as a configuration that corresponds to the control block C for performing a sequence of overwrite processes.

Also, the present invention can be applied to storage media, such as Compact Flash (registered trademark), that integrate a head for reading and writing data, head drive mechanism, disk drive mechanism, etc. into one unit. In such cases, the drive devices (recording and playing back devices) that read and write data from/to the storage media will have a configuration that corresponds to the control block C for performing a sequence of overwrite processes.

Also, the present invention may take the form of a program sending device or the like which comprises storage means such as a CD-ROM, DVD, memory, hard disk, or RAM for storing a program that runs processes such as those described with reference to the above embodiment, and transmission means for transmitting the program via a connector or a network such as the Internet or a LAN to the device that reads the program from the storage means.

Besides, it goes without saying that any configuration may be adopted as long as it does not deviate from the spirit and scope of the present invention.

As described above, the present invention can effectively protect the data stored in storage media and recording disks.

What is claimed is:

1. A method of processing data in a data storage device, comprising:
   (a) reading data from a data sector;
   (b) if step (a) is unsuccessful, initiating a data overwrite process by changing a pointer information of the data to RDM(d);
   (c) preparing a spare sector and changing the pointer information to RDM(s);
   (d) writing the data to the spare sector and conducting a read test thereof;
   (e) if the read test of step (d) is unsuccessful, repeating steps (c) and (d);
   (f) if the read test of step (d) is successful, storing the pointer information to RDM(s);
   (g) if step (f) is unsuccessful, switching the pointer information back to RDM(d) and then performing step (o);
   (h) if step (f) is successful, switching the pointer information back to RDM(d);
   (i) overwriting the data sector and conducting a read test thereof;
   (j) if step (i) is unsuccessful, changing the pointer information to RDM(s) and then performing step (o);
   (k) if step (i) is successful, releasing the spare sector;
   (l) changing and storing the pointer information to RDM(d);
   (m) if step (l) is unsuccessful, the pointer information remains RDM(s) and then performing step (o);
   (n) if step (l) is successful, proceeding to the next step; and
   (o) ending the method.

2. A method of overwriting data in a disk drive storage device, comprising:
   (a) attempting to read data from data sectors until a predetermined number of attempts is attempted;
   (b) if the data cannot be read in step (a), initiating a data overwrite process by changing a pointer information of the data to RDM(d);
   (c) preparing spare sectors and changing the pointer information to RDM(s);
   (d) attempting to write the data to the spare sectors and conduct a read test thereof for the predetermined number of attempts;
   (e) if the read test of step (d) is unsuccessful, repeating steps (c) and (d);
   (f) if the read test of step (d) is successful, attempting to store the pointer information to RDM(s) for the predetermined number of attempts;
   (g) if the pointer information is not stored in step (f) is unsuccessful, switching the pointer information back to RDM(d) and then performing step (o);
   (h) if the pointer information is stored in step (f), switching the pointer information back to RDM(d);
   (i) attempting to overwrite the data sectors and conduct a read test thereof for the predetermined number of attempts;
   (j) if the read test of step (i) is unsuccessful, changing the pointer information to RDM(s) and then performing step (o);
   (k) if the read test of step (i) is successful, releasing the spare sectors;
   (l) attempting to change and store the pointer information to RDM(d);
   (m) if the pointer information is not stored in step (l), the pointer information remains RDM(s) and then performing step (o);
   (n) if the pointer information is stored in step (l), proceeding to the next step; and
   (o) ending the method.

* * * * *